United States Patent
Swofford et al.

(10) Patent No.: US 11,892,210 B2
(45) Date of Patent: *Feb. 6, 2024

(54) VALVE AND CAPILLARY TUBE SYSTEM FOR REFRIGERATION SYSTEMS

(71) Applicant: Hill Phoenix, Inc., Conyers, GA (US)

(72) Inventors: Timothy D. Swofford, Midlothian, VA (US); Roy Bates, Chesterfield, VA (US)

(73) Assignee: Hill Phoenix, Inc., Conyers, GA (US)

( * ) Notice: Subject to any disclaimer, the term of this patent is extended or adjusted under 35 U.S.C. 154(b) by 208 days.

This patent is subject to a terminal disclaimer.

(21) Appl. No.: 17/341,021

(22) Filed: Jun. 7, 2021

(65) Prior Publication Data

US 2021/0364200 A1 Nov. 25, 2021

Related U.S. Application Data

(63) Continuation of application No. 15/642,856, filed on Jul. 6, 2017, now Pat. No. 11,029,066.

(Continued)

(51) Int. Cl.
*F25B 41/37* (2021.01)
*F25B 49/02* (2006.01)
(Continued)

(52) U.S. Cl.
CPC ............. *F25B 41/37* (2021.01); *F25B 41/34* (2021.01); *F25B 41/385* (2021.01); *F25B 41/39* (2021.01);
(Continued)

(58) Field of Classification Search
CPC ........ F25B 41/37; F25B 41/34; F25B 41/385; F25B 41/39; F25B 49/02; F25B 2341/062;
(Continued)

(56) References Cited

U.S. PATENT DOCUMENTS 2,056,401 A * 10/1936 Hoesel ................ F25B 5/02
62/200
4,269,042 A * 5/1981 Williams ............... F25B 41/39
62/511

(Continued)

FOREIGN PATENT DOCUMENTS

EP 2672205 12/2013
JP H11142024 5/1999

OTHER PUBLICATIONS

2006 ASHRAE Handbook—Refrigeration (1-P Edition), 2006, American Society of Heating, Refrigerating and Air-Conditioning Engineers, Inc., 44.30 Adiabatic Capillary Tube Selection Procedure, American Society of Heating, Refrigerating and Air-Conditioning Engineers, Inc., pp. 44.23-44.30.

(Continued)

*Primary Examiner* — Kun Kai Ma
(74) *Attorney, Agent, or Firm* — Fish & Richardson P.C.

(57) ABSTRACT

A refrigeration system includes an evaporator, a condenser, a compressor, a capillary tube, and an expansion device. The compressor is configured to circulate a refrigerant between the evaporator and the condenser. The capillary tube is configured to receive the refrigerant from the condenser. The expansion device is configured to receive the refrigerant from the capillary tube and provide the refrigerant to the evaporator. The expansion device is adjustable to control a flow of the refrigerant through the capillary tube.

20 Claims, 3 Drawing Sheets

Related U.S. Application Data

(60) Provisional application No. 62/360,791, filed on Jul. 11, 2016.

(51) Int. Cl.
*F25B 41/39* (2021.01)
*F25B 41/385* (2021.01)
*F25B 41/34* (2021.01)

(52) U.S. Cl.
CPC ........ *F25B 49/02* (2013.01); *F25B 2341/062* (2013.01); *F25B 2400/0411* (2013.01); *F25B 2600/21* (2013.01); *F25B 2600/2513* (2013.01)

(58) Field of Classification Search
CPC .......... F25B 2400/0411; F25B 2600/21; F25B 2600/2513; Y02B 30/70
See application file for complete search history.

(56) References Cited

U.S. PATENT DOCUMENTS

| | | | |
|---|---|---|---|
| 5,172,564 A | 12/1992 | Reedy | |
| 5,357,766 A * | 10/1994 | Shiraishi | F24F 1/0003 62/197 |
| 6,021,645 A | 2/2000 | Hara | |
| 6,415,619 B1 * | 7/2002 | Bash | G06F 1/20 257/E23.098 |
| 8,327,656 B2 * | 12/2012 | Tutunoglu | F24F 11/77 62/126 |
| 11,029,066 B2 | 6/2021 | Swofford et al. | |
| 2010/0324742 A1 | 12/2010 | Huerta-Ochoa | |
| 2011/0197009 A1 * | 8/2011 | Agrawal | G06F 13/423 710/305 |
| 2018/0010831 A1 | 1/2018 | Swofford et al. | |

OTHER PUBLICATIONS

Liang et al., "Experimental research and theoretical analysis on throttling characteristics of electronic expansion valve in series with capillary tube," 16th International Refrigeration and Air Conditioning Conference at Purdue University, dated Jul. 11-14, 2016, 8 pages.

\* cited by examiner

VALVE AND CAPILLARY TUBE SYSTEM FOR REFRIGERATION SYSTEMS

CROSS-REFERENCE TO RELATED PATENT APPLICATION

This application is a continuation application of, and claims priority under 35 U.S.C. § 120 to, U.S. application Ser. No. 15/642,856, filed on Jul. 6, 2017, which will issue as U.S. Pat. No. 11,029,066, which in turn claims the benefit of and priority to U.S. Provisional Patent Application No. 62/360,791 filed Jul. 11, 2016. The entire contents of each previous application are incorporated by reference herein.

BACKGROUND

The present disclosure relates generally to refrigeration systems and more particularly to a valve and capillary tube system for a refrigeration system.

Some refrigeration systems use flammable refrigerants. Flammable refrigerants typically offer higher efficiency and lower impact on the environment than conventional refrigerants. However, in many applications, the amount of these flammable refrigerants that can be used in a refrigeration system is limited. Typically, the refrigerant charge for a flammable refrigerant is less than the refrigerant charge for a non-flammable refrigerant. Accordingly, refrigeration systems that use flammable refrigerants typically use smaller tubing and a reduced number of heat exchanger circuits compared to refrigeration systems that use non-flammable refrigerants. Further, refrigeration systems that use flammable refrigerants are typically critically charged.

In many applications (e.g., residential refrigerators, deep freezers, water coolers, air conditioners, etc.), the refrigerant charge is largely contained within a condenser and a liquid line of the refrigeration system. Accordingly, condenser piping is typically minimized and the liquid line can be replaced by a capillary tube. The capillary tube typically runs from the condenser to an evaporator and is used as an expansion device. The capillary tube can be used to reduce the pressure from the condenser to the evaporator and to meter the amount of refrigerant flow simultaneously. However, the capillary tube must be sized correctly in order to operate efficiently at a set evaporator load. During times where the evaporator load is changed (e.g., restocking, environmental changes, opening of a door, after defrosting, etc.), the capillary tube may not be sized to accommodate the higher load that the refrigeration system experiences. Accordingly, the refrigeration system may not operate efficiently or effectively during these times.

SUMMARY

One implementation of the present disclosure is a refrigeration system. The refrigeration system includes an evaporator, a condenser, a compressor configured to circulate a refrigerant between the evaporator and the condenser, a capillary tube, and an expansion device. The capillary tube is configured to receive the refrigerant from the condenser. The expansion device is configured to receive the refrigerant from the capillary tube and provide the refrigerant to the evaporator. The expansion device is adjustable to control a flow of the refrigerant through the capillary tube.

In some embodiments, the capillary tube is configured to cause a fixed decrease in a measurable thermodynamic property of the refrigerant as a result of a physical geometry of the capillary tube. The expansion device may be adjustable to cause a variable decrease in the measureable thermodynamic property of the refrigerant to accommodate varying refrigeration loads. In some embodiments, the measurable thermodynamic property includes at least one of temperature, pressure, or enthalpy. In some embodiments, the refrigeration system includes a controller configured to modulate a position of the expansion device to adjust the variable decrease in the measureable thermodynamic property caused by the expansion device.

In some embodiments, the refrigeration system includes a sensor configured to measure a temperature of the refrigerant at an outlet of the evaporator and a controller configured to modulate a position of the expansion device to adjust the temperature of the refrigerant at the outlet of the evaporator. In some embodiments, the controller is configured to determine an amount of superheat in the refrigerant at the outlet of the evaporator based on the measured temperature, compare the amount of superheat to a superheat setpoint, and modulate the position of the expansion device to drive the amount of superheat to the superheat setpoint.

In some embodiments, the refrigeration system includes a bypass line arranged in parallel with the expansion device. The bypass line may be configured to receive the refrigerant from the capillary tube and provide the refrigerant to the evaporator such that the refrigerant bypasses the expansion device. In some embodiments, the refrigeration system includes a valve located along the bypass line and configured to modulate a flow of the refrigerant along the bypass line.

Another implementation of the present disclosure is a refrigeration system including an evaporator, a condenser, a compressor configured to circulate a refrigerant between the evaporator and the condenser, and a valve assembly. The valve assembly is configured to receive the refrigerant from the condenser and provide the refrigerant to the condenser. The valve assembly includes a capillary tube and an expansion device in series with the capillary tube.

In some embodiments, the capillary tube is configured to cause a fixed decrease in a measurable thermodynamic property of the refrigerant as a result of a physical geometry of the capillary tube. The expansion device may be adjustable to cause a variable decrease in the measureable thermodynamic property of the refrigerant to accommodate varying refrigeration loads. In some embodiments, the refrigeration system includes a controller configured to modulate a position of the expansion device to adjust the variable decrease in the measureable thermodynamic property caused by the expansion device.

In some embodiments, the refrigeration system includes a sensor configured to measure a temperature of the refrigerant at an outlet of the evaporator and a controller configured to modulate a position of the expansion device to adjust the temperature of the refrigerant at the outlet of the evaporator. In some embodiments, the controller is configured to determine an amount of superheat in the refrigerant at the outlet of the evaporator based on the measured temperature, compare the amount of superheat to a superheat setpoint, and modulate the position of the expansion device to drive the amount of superheat to the superheat setpoint.

In some embodiments, the valve assembly includes a bypass line arranged in parallel with the expansion device. The bypass line may be configured to receive the refrigerant from the capillary tube and provide the refrigerant to the evaporator such that the refrigerant bypasses the expansion device. In some embodiments, the valve assembly includes a valve located along the bypass line and configured to modulate a flow of the refrigerant along the bypass line.

Another implementation of the present disclosure is a valve assembly for refrigeration system. The valve assembly includes a capillary tube and an expansion device. The capillary tube is configured to receive a refrigerant from a condenser of the refrigeration system and cause a fixed decrease in a measurable thermodynamic property of the refrigerant as a result of a physical geometry of the capillary tube. The expansion device is configured to receive the refrigerant from the capillary tube and provide the refrigerant to an evaporator of the refrigeration system. The expansion device is adjustable to cause a variable decrease in the measureable thermodynamic property of the refrigerant to accommodate varying refrigeration loads.

In some embodiments, the valve assembly includes a bypass line arranged in parallel with the expansion device. The bypass line may be configured to receive the refrigerant from the capillary tube and provide the refrigerant to the evaporator such that the refrigerant bypasses the expansion device.

In some embodiments, the valve assembly includes a controller configured to modulate a position of the expansion device to adjust the variable decrease in the measureable thermodynamic property caused by the expansion device.

In some embodiments, the valve assembly includes a sensor configured to measure a temperature of the refrigerant at an outlet of a evaporator of the refrigeration system. The valve assembly may include a controller configured to modulate a position of the expansion device to adjust the temperature of the refrigerant at the outlet of the evaporator. In some embodiments, the controller is configured to determine an amount of superheat in the refrigerant at the outlet of the evaporator based on the measured temperature, compare the amount of superheat to a superheat setpoint, and modulate the position of the expansion device to drive the amount of superheat to the superheat setpoint.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
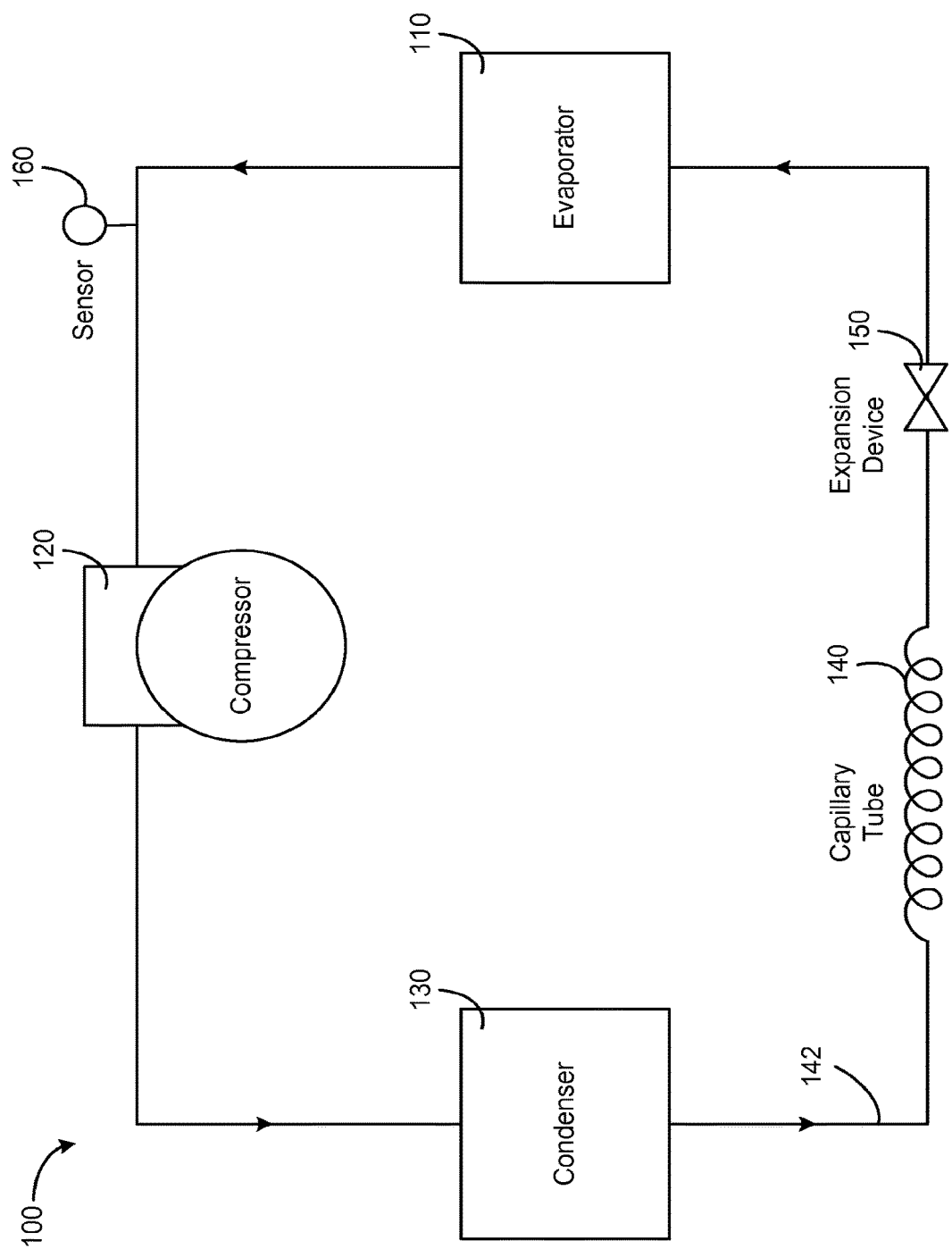
FIG. 1 is a diagram of a refrigeration system with a capillary tube in series with an expansion device, according to an exemplary embodiment.

Referring generally to the FIGURES, a refrigeration system with a valve and capillary tube system is shown, according to various exemplary embodiments. In some embodiments, the refrigeration system uses a flammable refrigerant. Flammable refrigerants typically offer higher efficiency and lower impact on the environment than conventional refrigerants. However, limits exist in many applications as to the amount of refrigerant, also known as the refrigerant charge, that can be utilized for flammable refrigerants. Typically, the refrigerant charge for a flammable refrigerant is less than the refrigerant charge for a non-flammable refrigerant. Accordingly, refrigeration systems that use flammable refrigerants typically use smaller tubing and a reduced number of heat exchanger circuits compared to refrigeration systems that use non-flammable refrigerants. Further, refrigeration systems that use flammable refrigerants are typically critically charged.

In conventional refrigeration applications (e.g., residential refrigerators, deep freezers, water coolers, air conditioners, etc.), the refrigerant charge is largely contained within a condenser and a liquid line of the refrigeration system. Accordingly, condenser piping can be minimized and the liquid line can be replaced by a capillary tube. The capillary tube typically runs from the condenser to an evaporator and can be used as an expansion device. The capillary tube can be used to reduce the pressure from the condenser to the evaporator and to meter the amount of refrigerant flow simultaneously. However, the capillary tube must be sized correctly in order to operate efficiently at a set evaporator load.

The capillary tube in a conventional refrigeration system has a length greater than three and a half meters. The length of the capillary tube is determined based on the set evaporator load, a pressure drop between the condenser and the evaporator, the refrigerant utilized in the refrigeration system, and the inner diameter of the capillary tube. During times where the evaporator load is changed (e.g., restocking, environmental changes, opening of a door, after defrosting, etc.), the capillary tube may not be sized to accommodate the higher load that the refrigeration system experiences. Accordingly, the refrigeration system may not operate efficiently or effectively during these times. The refrigeration system described herein overcomes these and other disadvantages of conventional refrigeration systems that use capillary tubes.

The refrigeration system described herein may include an evaporator, a compressor, a condenser, a capillary tube, and an expansion device. The capillary tube and the expansion device cooperate to provide precise control of the refrigeration system. For example, the expansion device can be arranged in series with the capillary tube to accommodate varying refrigeration loads. This precise control allows the refrigeration system to use charges of refrigerant other than a critical charge amount. Similarly, the cooperation allows for the capillary tube to have a length that is much less than a length of a conventional capillary tube.

In some embodiments, the refrigeration system includes one or more sensors and a controller. The sensors may obtain measurements of the refrigerant temperature, pressure, enthalpy, or other refrigerant conditions at various locations in the refrigeration system and may provide the measurements to the controller. The controller may operate the expansion device in response to the measurements. In some embodiments, the controller operates the expansion device to modulate refrigerant flow to maintain a predetermined amount of superheat at the outlet of the evaporator. These and other features of the refrigeration system are described in greater detail below.

Refrigeration System

Referring now to FIG. 1, a block diagram of a refrigeration system 100 is shown, according to an exemplary embodiment. Refrigeration system 100 may be utilized by a variety of different refrigeration applications. For example, refrigeration system 100 may be utilized in commercial refrigerators, residential refrigerators, industrial refrigerators, refrigerated cases, freezers, chest freezers, air conditioning units, refrigerated vehicles, refrigerated tractor trailers, refrigerated compartments, refrigerated packages, and other similar applications. In some embodiments, refrigeration system 100 uses a flammable refrigerant such as R-1270, R-290, R-600, and other similar refrigerants. In other embodiments, refrigeration system 100 can be used with non-flammable or slightly-flammable refrigerant.

Refrigeration system 100 is shown to include a first heat exchanger (e.g., heat transfer device, etc.), shown as evaporator 110. Evaporator 110 can be configured to receive a refrigerant as a liquid-gas mixture and to produce a refrigerant gas. However, in some instances evaporator 110 may produce a liquid-gas mixture. Evaporator 110 can be configured to evaporate any of liquid in the liquid-gas mixture received by evaporator 110 by transferring heat to the liquid-gas mixture. Heat may be transferred to the liquid-gas mixture by passing warm air or fluid over the liquid-gas mixture in evaporator 110. Evaporator 110 can be configured to provide a rate of cooling to a thermal transfer fluid or an environment (e.g., air, etc.).

Evaporator 110 may provide the refrigerant gas to a compressor, shown as compressor 120. Compressor 120 can be configured to receive refrigerant gas at a first pressure and to produce gas at a second pressure higher than the first pressure. Compressor 120 can be configured to provide the refrigerant gas at the second pressure to a second heat exchanger (e.g., heat transfer device, etc.), shown as condenser 130. Condenser 130 can be configured to receive the refrigerant as a gas mixture and produce a liquid refrigerant. However, in some instances condenser 130 may produce a liquid-gas mixture. Condenser 130 can be configured to condense the gas refrigerant received by condenser 130 by transferring heat from the gas refrigerant in condenser 130. Heat may be transferred from the gas refrigerant in condenser 130 by passing a thermal transfer fluid (e.g., air, water, glycol, etc.) over condenser 130.

Condenser 130 can provide the refrigerant liquid to a throttling device, shown as capillary tube 140. In some embodiments, capillary tube 140 has a length that is less than three and a half meters such that capillary tube 140 has a length that is less than the length of a typical capillary tube. According to various embodiments, capillary tube 140 has an inner diameter that is less than an inner diameter of a liquid line 142 connecting condenser 130 to capillary tube 140. In some applications, capillary tube 140 is coiled or otherwise wound. Capillary tube 140 can be configured to reduce the pressure of the liquid refrigerant from a first pressure to a second pressure less than the first pressure. Because of the relatively short length of capillary tube 140, the pressure drop from the first pressure to the second pressure can be limited while the amount of refrigerant in capillary tube 140 is also limited.

Capillary tube 140 provides the liquid refrigerant to an expansion device (e.g., thermal expansion valve, electronic expansion valve, etc.), shown as expansion device 150. However, in some instances capillary tube 140 provides the refrigerant as a liquid-gas mixture to expansion device 150. Expansion device 150 can be configured to expand the refrigerant to a low-temperature, low-pressure state and provide the refrigerant as a liquid-gas mixture to evaporator 110. Expansion device 150 can configured to control the flow of the liquid-gas mixture. Expansion device 150 may be controlled electronically, through the use of a controller, or may be manually controlled.

In some embodiments, refrigeration system 100 includes a sensor, shown as sensor 160, positioned between evaporator 110 and compressor 120. Sensor 160 can be configured to obtain at least one metric related to the flow of the refrigerant gas and/or liquid-gas mixture. For example, sensor 160 may obtain the temperature, pressure, enthalpy, flow rate, or other similar quantity of the flow of gas and/or liquid-gas mixture. In some embodiments, sensor 160 is configured measure a temperature of the refrigerant at the outlet of evaporator 110 and expansion device 150 is configured to be controlled based on the temperature. For example, expansion device 150 can be controlled to maintain a predetermined amount of superheat in the refrigerant at the outlet of evaporator 110. In other embodiments, sensor 160 is configured to obtain a temperature and a pressure and the expansion device 150 is configured to be controlled according to the temperature and pressure. In this way, refrigeration system 100 may be operated to provide a desired rate of cooling of evaporator 110.

Typical capillary tubes do not offer variable control of a refrigeration system. Consequently, conventional refrigeration systems must be critically charged. In this way, conventional refrigeration systems are not able to easily account for various changes such as when the refrigeration system is restocked, when environmental conditions change, when a door of the refrigeration system is opened, after defrosting the refrigeration system, and other similar changes. Capillary tube 140 and expansion device 150 cooperate to provide precise control of refrigeration system 100 while allowing refrigeration system 100 to utilize charges of refrigerant other than the critical charge amount.

Refrigeration System With Bypass Line

Figure 2:
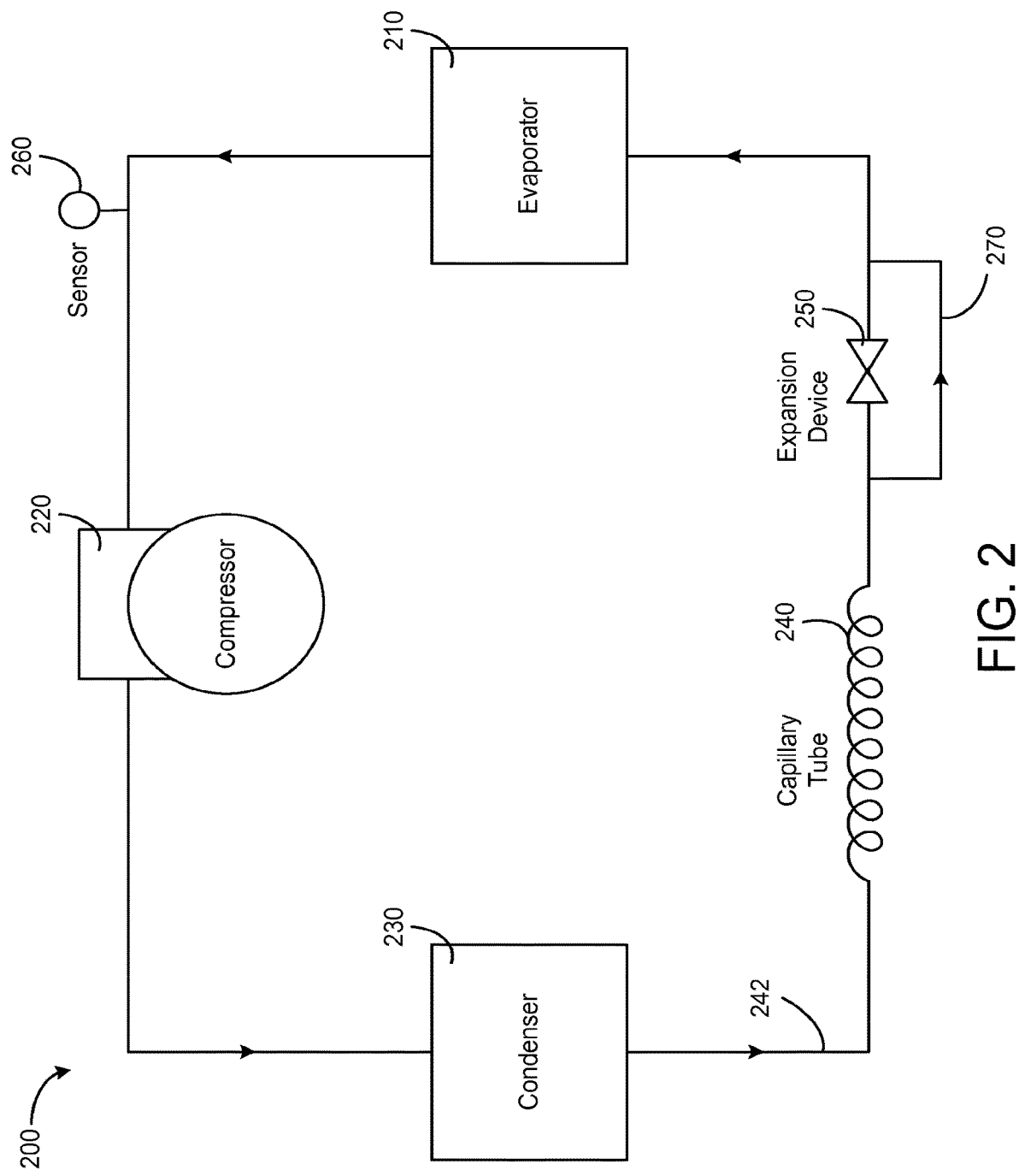
FIG. 2 is a diagram of another refrigeration system with a capillary tube in series with an expansion device and a bypass line in parallel with the expansion device, according to an exemplary embodiment.

Referring now to FIG. 2, a block diagram of a refrigeration system 200 is shown, according to an exemplary embodiment. Refrigeration system 200 may be utilized by a variety of different refrigeration applications. For example, refrigeration system 200 may be utilized in commercial refrigerators, residential refrigerators, industrial refrigerators, refrigerated cases, freezers, chest freezers, air conditioning units, refrigerated vehicles, refrigerated tractor trailers, refrigerated compartments, refrigerated packages, and other similar applications. In some embodiments, refrigeration system 200 uses a flammable refrigerant such as R-1270, R-290, R-600, and other similar refrigerants. In other embodiments, refrigeration system 200 can be used with non-flammable or slightly-flammable refrigerant.

Refrigeration system 200 is shown to include a first heat exchanger (e.g., heat transfer device, etc.), shown as evaporator 210. Evaporator 210 can be configured to receive a refrigerant as a liquid-gas mixture and to produce a refrigerant gas. However, in some instances evaporator 210 may produce a liquid-gas mixture. Evaporator 210 can be configured to evaporate any of liquid in the liquid-gas mixture received by evaporator 210 by transferring heat to the liquid-gas mixture. Heat may be transferred to the liquid-gas mixture by passing warm air or fluid over the liquid-gas mixture in evaporator 210. Evaporator 210 can be configured to provide a rate of cooling to a thermal transfer fluid or an environment (e.g., air, etc.).

Evaporator 210 may provide the refrigerant gas to a compressor, shown as compressor 220. Compressor 220 can be configured to receive refrigerant gas at a first pressure and to produce gas at a second pressure higher than the first pressure. Compressor 220 can be configured to provide the refrigerant gas at the second pressure to a second heat exchanger (e.g., heat transfer device, etc.), shown as condenser 230. Condenser 230 can be configured to receive the refrigerant as a gas mixture and produce a liquid refrigerant. However, in some instances condenser 230 may produce a liquid-gas mixture. Condenser 230 can be configured to condense the gas refrigerant received by condenser 230 by transferring heat from the gas refrigerant in condenser 230. Heat may be transferred from the gas refrigerant in condenser 230 by passing a thermal transfer fluid (e.g., air, water, glycol, etc.) over condenser 230.

Condenser 230 can provide the refrigerant liquid to a throttling device, shown as capillary tube 240. In some embodiments, capillary tube 240 has a length that is less than three and a half meters such that capillary tube 240 has a length that is less than the length of a typical capillary tube. According to various embodiments, capillary tube 240 has an inner diameter that is less than an inner diameter of a liquid line 242 connecting condenser 230 to capillary tube 240. In some applications, capillary tube 240 is coiled or otherwise wound. Capillary tube 240 can be configured to reduce the pressure of the liquid refrigerant from a first pressure to a second pressure less than the first pressure. Because of the relatively short length of capillary tube 240, the pressure drop from the first pressure to the second pressure can be limited while the amount of refrigerant in capillary tube 240 is also limited.

Capillary tube 240 provides the liquid refrigerant to an expansion device (e.g., thermal expansion valve, electronic expansion valve, etc.), shown as expansion device 250. However, in some instances capillary tube 240 provides the refrigerant as a liquid-gas mixture to expansion device 250. Expansion device 250 can be configured to expand the refrigerant to a low-temperature, low-pressure state and provide the refrigerant as a liquid-gas mixture to evaporator 210. Expansion device 250 can configured to control the flow of the liquid-gas mixture. Expansion device 250 may be controlled electronically, through the use of a controller, or may be manually controlled.

In some embodiments, refrigeration system 200 includes a sensor, shown as sensor 260, positioned between evaporator 210 and compressor 220. Sensor 260 can be configured to obtain at least one metric related to the flow of the refrigerant gas and/or liquid-gas mixture. For example, sensor 260 may obtain the temperature, pressure, enthalpy, flow rate, or other similar quantity of the flow of gas and/or liquid-gas mixture. In some embodiments, sensor 260 is configured measure a temperature of the refrigerant at the outlet of evaporator 210 and expansion device 250 is configured to be controlled based on the temperature. For example, expansion device 250 can be controlled to maintain a predetermined amount of superheat in the refrigerant at the outlet of evaporator 210. In other embodiments, sensor 260 is configured to obtain a temperature and a pressure and the expansion device 250 is configured to be controlled according to the temperature and pressure. In this way, refrigeration system 200 may be operated to provide a desired rate of cooling of evaporator 210.

Typical capillary tubes do not offer variable control of a refrigeration system. Consequently, conventional refrigeration systems must be critically charged. In this way, conventional refrigeration systems are not able to easily account for various changes such as when the refrigeration system is restocked, when environmental conditions change, when a door of the refrigeration system is opened, after defrosting the refrigeration system, and other similar changes. Capillary tube 240 and expansion device 250 cooperate to provide precise control of refrigeration system 200 while allowing refrigeration system 200 to utilize charges of refrigerant other than the critical charge amount.

In some embodiments, refrigeration system 200 includes a refrigerant line (e.g., capillary tube, etc.), shown as bypass line 270. Bypass line 270 may be arranged in parallel with expansion device 250 and configured to provide the liquid refrigerant from capillary tube 240 to evaporator 210 without passing through expansion device 250. In some embodiments, bypass line 270 operates as a bleeder system as it is configured to only allow a small amount of the liquid refrigerant to bypass expansion device 250. For example, expansion device 250 may allow ninety-five percent of liquid through to evaporator 210 and bypass line 270 may allow the remaining five percent to bypass expansion device 250. In some embodiments, bypass line 270 may be incorporated into expansion device 250 such that an additional line is not required. Alternatively, multiple bypass lines 270 may be utilized. In some embodiments, refrigeration system 200 includes a valve located along bypass line 270, which can be operated to control the flow of liquid refrigerant through bypass line 270.

In some embodiments, refrigeration system 200 includes a valve assembly. According to various embodiments, the valve assembly includes capillary tube 240 and expansion device 250. In other embodiments, the valve assembly includes capillary tube 240, expansion device 250, and bypass line 270. In still other embodiments, the valve assembly includes capillary tube 240, expansion device 250, sensor 260, and bypass line 270. In this way, the valve assembly may be retrofit on an existing refrigeration system to obtain refrigeration system 200.

Control System

Figure 3:
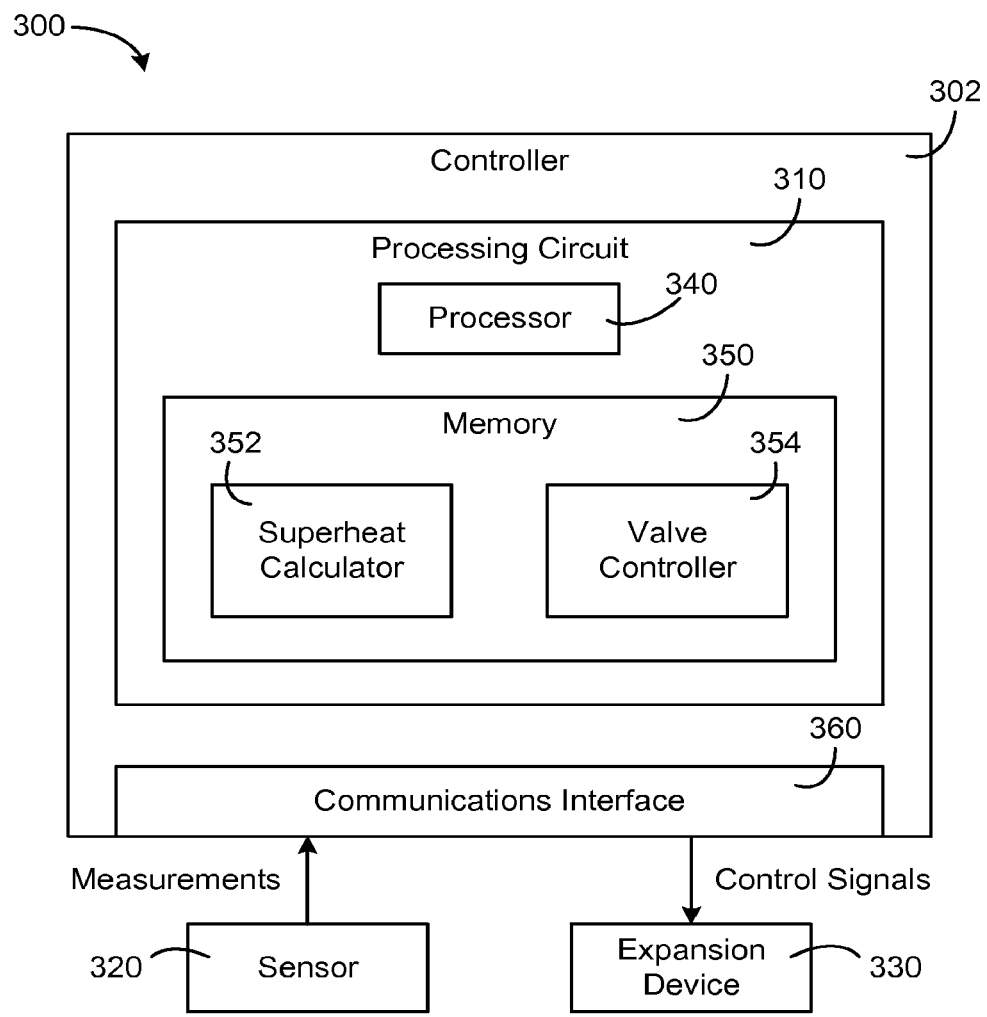
FIG. 3 is a diagram of a control system which can be used to monitor and control the refrigeration systems of FIGS. 1-2, according to an exemplary embodiment.

Referring now to FIG. 3, a control system 300 is shown, according to an exemplary embodiment. Control system 300 can be used to monitor and control refrigeration system 100 and/or refrigeration system 200. Control system 300 is shown to include a controller 302, a sensor 320, and an expansion device 330. It is understood that the forgoing description of sensors 160 and 260 applies to sensor 320 and that the forgoing description of expansion devices 150 and 250 applies to expansion device 330. Controller 302 can be configured to receive measurements from sensor 320 (e.g., temperature, pressure, enthalpy, etc.) and provide control signals to expansion device 330 (e.g., valve position commands). Controller 302 can be configured to communicate with sensor 320 and expansion device 330 via communications interface 360.

Communications interface 360 may include wired or wireless interfaces (e.g., jacks, antennas, transmitters, receivers, transceivers, wire terminals, etc.) for conducting data communications with various systems, devices, or networks. For example, communications interface 360 may include an Ethernet card and port for sending and receiving data via an Ethernet-based communications network. In another example, communications interface 360 may include a Wi-Fi transceiver for communicating via a wireless communications network. Communications interface 360 may be configured to communicate via local area networks or wide area networks (e.g., the Internet, a building WAN, etc.) and may use a variety of communications protocols (e.g., TCP/IP, point-to-point, etc.). In some embodiments, controller 302 uses communications interface 360 to receive measurements from sensor 320 send control signals to various operable components of refrigeration systems 100 and 200 (e.g., expansion device 330).

In some embodiments, controller 302 includes a processing circuit 310 having a processor 340 and memory 350. Processor 340 may be a general purpose or specific purpose processor, an application specific integrated circuit (ASIC), one or more field programmable gate arrays (FPGAs), a group of processing components, or other suitable processing components. Processor 340 may be configured to execute computer code or instructions stored in memory 350 or received from other computer readable media (e.g., CDROM, network storage, a remote server, etc.). Memory 350 may include one or more devices (e.g., memory units, memory devices, storage devices, etc.) for storing data and/or computer code for completing and/or facilitating the various processes described in the present disclosure. Memory 350 may include random access memory (RAM), read-only memory (ROM), hard drive storage, temporary storage, non-volatile memory, flash memory, optical memory, or any other suitable memory for storing software objects and/or computer instructions. Memory 350 may include database components, object code components, script components, or any other type of information structure for supporting the various activities and information structures described in the present disclosure. Memory 350 may be communicably connected to processor 340 via processing circuit 310 and may include computer code for executing one or more processes described herein.

Controller 302 can be configured to analyze the measurements from sensor 320. For example, controller 302 is shown to include a superheat calculator 352 which may determine an amount of superheat in the refrigerant based on measurements from sensor 320. Controller 302 can be configured to control expansion device 330 according to the measurements. For example, controller 302 is shown to include a valve controller 354. Valve controller 354 can be configured to generate control signals for expansion device 330 to control a flow rate of the refrigerant through expansion device 330, a pressure drop caused by expansion device 330, and/or a temperature drop caused by expansion device 330 according to the measurements from sensor 320. However, in some alternative embodiments where expansion device 330 is manually controlled (e.g., through the turning of a wheel by a user, etc.), controller 302 may provide the measurements to a display device associated with control system 300. The display device may allow a user to manually control expansion device 330.

In operation, sensor 320 transmits measurements to controller 302. Sensor 320 may transmit measurements in substantially real time or in measurement intervals (e.g., one measurement transmitted every fifteen seconds, etc.). Communications interface 360 receives the measurements and provides them to processing circuit 310. Superheat calculator 352 uses the measurements to calculate an amount of superheat in the refrigerant (i.e., a number of degrees above the condensing temperature) at the location of sensor 320. For example, superheat calculator 352 may obtain stored instructions for processor 340 for interpreting the measurements. Valve controller 354 then determines how to control expansion device 330 based on the measurements and/or the amount of superheat calculated by superheat calculator 352. In some applications, valve controller 354 controls expansion device 330 based on stored instructions corresponding to the measurements.

In some embodiments, processing circuit 310 is implemented as a component of controller 302. However, it is contemplated that processing circuit 310 can be a component of the valve assembly in alternative embodiments. For example, processing circuit 310 may be an integral component of an electronic expansion valve (e.g., expansion device 330) configured to regulate the flowrate, pressure drop, and/or temperature drop of the refrigerant between capillary tube 140, 240 and evaporator 110, 210.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The background section is intended to provide a background or context to the invention recited in the claims. The description in the background section may include concepts that could be pursued, but are not necessarily ones that have been previously conceived or pursued. Therefore, unless otherwise indicated herein, what is described in the background section is not prior art to the description and claims and is not admitted to be prior art by inclusion in the background section.

What is claimed is:

1. A refrigeration system, comprising:
   an evaporator;
   a condenser;
   a compressor configured to circulate a refrigerant between the evaporator and the condenser;
   a capillary tube positioned downstream from the condenser and configured to receive refrigerant exiting from the condenser, the capillary tube configured to cause a fixed decrease in a measurable thermodynamic property of the refrigerant as a result of a geometry of the capillary tube;
   an expansion valve positioned in series with the capillary tube and configured to receive the refrigerant from the capillary tube and provide the refrigerant to the evaporator, the expansion valve adjustable to control a flow rate of the refrigerant through the capillary tube and cause a variable decrease in the measurable thermodynamic property of the refrigerant based at least in part on a refrigeration load, the refrigerant exiting from the condenser passes through the capillary tube before being supplied to the expansion valve;
   a bypass line arranged in parallel with the expansion valve and configured to allow a first portion of the refrigerant to bypass the expansion valve while allowing a second portion of the refrigerant to pass through the expansion valve, the bypass line comprising a bleeder system configured to bypass the first portion of the refrigerant in the bypass line at an order of magnitude less than the second portion of the refrigerant passed to the expansion valve;
   a sensor positioned downstream of the capillary tube and configured to measure a temperature of the refrigerant and generate a signal corresponding to the measured temperature of the refrigerant; and
   a controller in communication with the sensor and configured to:
      determine an amount of superheat in the refrigerant at an outlet of the evaporator based on the measured temperature;
      compare the amount of superheat to a superheat setpoint; and
      drive the amount of superheat to the superheat setpoint by adjusting a decrease in the measurable thermodynamic property of the of the refrigerant by modulating the expansion valve, the decrease in the measurable thermodynamic property of the refrigerant being a sum of the fixed decrease in the measurable thermodynamic property of the refrigerant caused by the capillary tube and the variable decrease in the measurable thermodynamic property of the refrigerant caused by the expansion valve.

2. The refrigeration system of claim 1, wherein a charge of the refrigerant in the refrigeration system differs from a critical charge of the refrigerant.

3. The refrigeration system of claim 1, wherein the measurable thermodynamic property comprises at least one of temperature, pressure, or enthalpy.

4. The refrigeration system of claim 1, wherein the bypass line is configured to receive the first portion of the refrigerant from the capillary tube and provide the first portion of the refrigerant to the evaporator such that the first portion of the refrigerant bypasses the expansion valve.

5. The refrigeration system of claim 4, wherein all refrigerant exiting from the condenser passes through the capillary tube before being supplied to the bypass line.

6. The refrigeration system of claim 1, wherein the capillary tube, the expansion valve, and the bypass line comprise a valve assembly configured to receive the refrigerant from the condenser and provide the refrigerant to the evaporator.

7. The refrigeration system of claim 1, wherein a position of the expansion valve is configured for manual control by a user to adjust a position of the expansion valve and adjust the decrease in the measurable thermodynamic property of the refrigerant.

8. The refrigeration system of claim 1, wherein the controller is further configured to output an indication on a display device corresponding to the measured temperature of the refrigerant detected by the sensor.

9. A refrigeration system, comprising:
an evaporator;
a condenser;
a compressor configured to circulate a refrigerant between the evaporator and the condenser, a charge of the refrigerant in the refrigeration system different than a critical charge of the refrigerant;
a capillary tube positioned downstream from the condenser and configured to receive refrigerant exiting from the condenser, the capillary tube being configured to cause a fixed decrease in a measurable thermodynamic property of the refrigerant as a result of a geometry of the capillary tube;
an expansion valve positioned in series with the capillary tube and configured to receive the refrigerant from the capillary tube and provide the refrigerant to the evaporator, the expansion valve adjustable to control a flow rate of the refrigerant through the capillary tube and cause a variable decrease in the measurable thermodynamic property of the refrigerant to accommodate a refrigeration load, the refrigerant exiting from the condenser passing through the capillary tube before being supplied to the expansion valve;
a sensor positioned downstream of the capillary tube and configured to measure a temperature of the refrigerant and generate a signal corresponding to the measured temperature of the refrigerant; and
a controller in communication with the sensor and configured to:
determine an amount of superheat in the refrigerant at an outlet of the evaporator based on the measured temperature;
compare the amount of superheat to a superheat setpoint; and
drive the amount of superheat to the superheat setpoint by adjusting a decrease in the measurable thermodynamic property of the of the refrigerant by modulating the expansion valve, the decrease in the measurable thermodynamic property of the refrigerant being a sum of the fixed decrease in the measurable thermodynamic property of the refrigerant caused by the capillary tube and the variable decrease in the measurable thermodynamic property of the refrigerant caused by the expansion valve.

10. The refrigeration system of claim 9, further comprising a bypass line arranged in parallel with the expansion valve and configured to allow a portion of the refrigerant to bypass the expansion valve while allowing a remaining amount of the refrigerant to pass through the expansion valve.

11. The refrigeration system of claim 10, wherein the bypass line is configured to receive the portion of the refrigerant from the capillary tube and provide the portion of the refrigerant to the evaporator such that the portion of the refrigerant bypasses the expansion valve.

12. The refrigeration system of claim 11, wherein all refrigerant exiting from the condenser passes through the capillary tube before being supplied to the bypass line.

13. The refrigeration system of claim 10, wherein the capillary tube, the expansion valve, and the bypass line comprise a valve assembly configured to receive the refrigerant from the condenser and provide the refrigerant to the evaporator.

14. The refrigeration system of claim 9, wherein the measurable thermodynamic property comprises at least one of temperature, pressure, or enthalpy.

15. A valve assembly for a refrigeration system, the valve assembly comprising:
a capillary tube configured to receive all refrigerant exiting from a condenser of the refrigeration system and cause a fixed decrease in a measurable thermodynamic property of the refrigerant as a result of a geometry of the capillary tube;
an expansion valve positioned downstream of the capillary tube and configured to receive the refrigerant from the capillary tube and provide the refrigerant to an evaporator of the refrigeration system, the expansion valve adjustable to cause a variable decrease in the measureable thermodynamic property of the refrigerant to accommodate varying refrigeration loads, the expansion valve positioned within the valve assembly such that refrigerant passing through the expansion valve first passes through the capillary tube;
a bypass line arranged in parallel with the expansion valve and configured to allow a portion of the refrigerant to bypass the expansion valve while requiring a remaining amount of the refrigerant to pass through the expansion valve, the bypass line comprising a bleeder system configured to bypass the portion of the refrigerant in the bypass line at an order of magnitude less than the remaining amount of the refrigerant to pass through the expansion valve;
a sensor positioned downstream of the evaporator and configured to measure a temperature of the refrigerant upon exiting the evaporator; and
a controller in communication with the sensor and configured to:
determine an amount of superheat in the refrigerant at an outlet of the evaporator based on the measured temperature;
compare the amount of superheat to a superheat setpoint; and
drive the amount of superheat to the superheat setpoint by adjusting a decrease in the measurable thermodynamic property of the of the refrigerant by modulating the expansion valve, the decrease in the measurable thermodynamic property of the refrigerant being a sum of the fixed decrease in the measurable thermodynamic property of the refrigerant caused by the capillary tube and the variable decrease in the measurable thermodynamic property of the refrigerant caused by the expansion valve.

16. The valve assembly of claim 15, wherein the capillary tube has a length less than three and a half meters.

17. The valve assembly of claim 15, wherein the bypass line is configured to receive the portion of the refrigerant from the capillary tube and provide the portion of the refrigerant to the evaporator such that the portion of the refrigerant bypasses the expansion valve.

18. The valve assembly of claim 15, wherein a charge of the refrigerant in the refrigeration system differs from a critical charge of the refrigerant.

19. The valve assembly of claim 15, wherein a position of the expansion valve is configured for manual control by a user to adjust a position of the expansion valve and adjust the decrease in the measurable thermodynamic property of the refrigerant.

20. The refrigeration system of claim 15, wherein the controller is further configured to output an indication on a display device corresponding to the measured temperature of the refrigerant detected by the sensor.

* * * * *

UNITED STATES PATENT AND TRADEMARK OFFICE
CERTIFICATE OF CORRECTION

PATENT NO. : 11,892,210 B2
APPLICATION NO. : 17/341021
DATED : February 6, 2024
INVENTOR(S) : Timothy D. Swofford and Roy Bates It is certified that error appears in the above-identified patent and that said Letters Patent is hereby corrected as shown below:

In the Claims

Column 12, Line 49, Claim 1, delete "of the of the" and insert -- of the --.

Column 13, Line 54, Claim 9, delete "of the of the" and insert -- of the --.

Column 14, Line 29, Claim 15, delete "measureable" and insert -- measurable --.

Column 14, Line 55, Claim 15, delete "of the of the" and insert -- of the --.

Signed and Sealed this
Second Day of April, 2024

Katherine Kelly Vidal
*Director of the United States Patent and Trademark Office*